United States Patent
Weiske

(10) Patent No.: US 9,780,607 B2
(45) Date of Patent: Oct. 3, 2017

(54) STATOR CORE FOR AN ELECTRONICALLY COMMUTATED DIRECT CURRENT MOTOR AND METHOD FOR PRODUCING A STATOR

(71) Applicant: Bühler Motor GmbH, Nürnberg (DE)

(72) Inventor: Klaus Weiske, Schwaig (DE)

(73) Assignee: BÜHLER MOTOR GMBH, Nürnberg (DE)

(*) Notice: Subject to any disclaimer, the term of this patent is extended or adjusted under 35 U.S.C. 154(b) by 0 days.

(21) Appl. No.: 15/041,270

(22) Filed: Feb. 11, 2016

(65) Prior Publication Data

US 2016/0164351 A1    Jun. 9, 2016

Related U.S. Application Data

(63) Continuation of application No. PCT/DE2014/200247, filed on Jun. 5, 2014.

(30) Foreign Application Priority Data

Aug. 21, 2013  (DE) .................. 10 2013 216 576

(51) Int. Cl.
    *H02K 1/16*   (2006.01)
    *H02K 1/14*   (2006.01)
    (Continued)

(52) U.S. Cl.
    CPC ............ *H02K 1/148* (2013.01); *H02K 1/146* (2013.01); *H02K 15/022* (2013.01); *H02K 15/095* (2013.01)

(58) Field of Classification Search
    CPC ........................ H02K 1/148; H02K 15/022
    See application file for complete search history.

(56) References Cited

U.S. PATENT DOCUMENTS

| | | | |
|---|---|---|---|
| 6,265,804 B1* | 7/2001 | Nitta ............... | H02K 1/148 310/193 |
| 6,741,005 B2* | 5/2004 | Vohlgemuth .......... | H02K 1/16 29/596 |

(Continued)

FOREIGN PATENT DOCUMENTS

| DE | 10 2010 043 976 A1 | 5/2012 |
|---|---|---|
| JP | 2005-176431 A | 6/2005 |
| JP | 2007-267585 A | 10/2007 |

OTHER PUBLICATIONS

English Translation of International Search Report dated Sep. 22, 2015, issued in counterpart Application No. PCT/DE2014/200247 (2 pages).

*Primary Examiner* — Dang Le
(74) *Attorney, Agent, or Firm* — Westerman, Hattori, Daniels & Adrian, LLP

(57) ABSTRACT

A stator core for an electronically commutated DC motor with an internal rotor having a plurality of radially inwardly directed pole cores which at their periphery are integral with back iron segments and the back iron segments are integral with adjacent back iron segments via webs, wherein the back iron segments alternate with the webs and jointly form a seamless closed one-piece ring. A method of ensuring that in the case of a stator core of this class, upon a reduction of the stator diameter and reduction of the pole distances after winding, a clearly defined end position of the adjoining regions can be assumed, and that for this process, only minimal forces are necessary, in which damage to the stator core is not to be expected, and that at the end of the process only a very small and uniform air gap remains at a lowest possible spring-back.

4 Claims, 2 Drawing Sheets

(51) Int. Cl.
    *H02K 15/095*     (2006.01)
    *H02K 15/02*     (2006.01)

(56) References Cited

U.S. PATENT DOCUMENTS

| | | | |
|---|---|---|---|
| 7,067,952 B2* | 6/2006 | Neal | G11B 19/2009 310/254.1 |
| 7,576,467 B2* | 8/2009 | Yamamoto | H02K 3/325 310/215 |
| 2002/0067086 A1* | 6/2002 | Kikuchi | H02K 1/148 310/54 |
| 2012/0126659 A1* | 5/2012 | Jurkowski | H02K 1/146 310/216.074 |

* cited by examiner

STATOR CORE FOR AN ELECTRONICALLY COMMUTATED DIRECT CURRENT MOTOR AND METHOD FOR PRODUCING A STATOR

BACKGROUND OF THE INVENTION (1) Field of the Invention

The invention relates to a stator core for an electronically commutated DC motor with an internal rotor. The stator has a plurality of radially inwardly directed pole cores which at their periphery are integral with back iron segments, and the back iron segments are integral with adjacent back iron segments.

(2) Description of Related Art Including Information Under 37 CFR 1.97 and 1.99

A generic stator core is known from DE 10 2010 043 976 A1 in which the back iron segments are connected together by compression regions arranged between the back iron segments lying opposite one another within an outer circle described by the latter. A stator core is supposed to be provided by the described arrangement of the poles of which, in particular pole pieces of which, are spaced a greater distance from each other. The increased distance serves to simplify the winding of the poles when using a needle winding method and to increase the number of turns of the stator winding, thus increasing the torque that can be achieved. By the use of compression areas, considerable forces are necessary after winding to reduce the diameter of the stator core and to reduce the increased distances between the poles and the pole pieces. The amount of force may use damage to the stator core. Using stator laminations could cause current bridges to be formed by mechanical deformation, for example, which favor the formation of eddy currents, resulting in loss of efficiency. Another disadvantage is that, during the pressing process, the back iron segments must be properly handled to obtain a defined reproducible final geometry.

BRIEF SUMMARY OF THE INVENTION

The object of the invention is thus to ensure that in the case of as stator core of this type, upon a reduction of the stator diameter and reduction of the pole distances after a winding, as clearly defined end position of the adjoining regions can be assumed, and that for this process step, only minimal forces are necessary in which damage to the stator core is not to be expected, and that at the end of the process only a very small and uniform air gap remains at a lowest possible spring-back.

The present invention is for a stator core for an electronically commutated DC motor with an internal rotor, the stator core comprises a plurality of back iron segments, a plurality of webs, a plurality of radially inwardly directed pole cores which at their periphery are integral with the back iron segments and the back iron segments are integral with adjacent back iron segments via the webs, wherein the back iron segments alternate with the webs and jointly form a seamless closed one-piece ring, wherein the webs are arranged essentially outside of the outer circle defined by the back iron segments.

Since the webs are arranged substantially outside the outer circle described by the back iron segments, a reduction in the stator core diameter is achieved not by compression but by bending. In doing so, the leverage ratios are favorable and the bending forces are minimal. Due to the small bending forces, no significant mechanical damage to the stator core can occur.

In order to keep the bending forces low, the webs have three predetermined bending lines at which they are substantially thinner than in areas between the predetermined bending lines. In addition, this geometry allows a kind of folding of the webs.

In this connection, two outer target bending lines are arranged at transitions between back iron segments and webs and an intermediate predetermined bending line is arranged between the two triangular areas of the web and between the two outer predetermined bending lines. All of the bending lines are parallel to the longitudinal axis of the stator core. In a final assembled state, the triangular areas form current bridges and thus form parts of the magnetic back iron ring. The predetermined bending lines produce a defined and reproducible reshaping of the stator core.

The distance between the intermediate predetermined bending line and the two outer target bending lines is the same and is slightly larger than the thickness of the back iron segments in the radial direction. This dimensioning is based on the fact that the tangential side surfaces of the back iron segments do not extend radially, but rather at an angle to the radial direction, whereby the side surfaces are slightly larger than the radially extending side surfaces. The distances of the predetermined bending lines from the intermediate predetermined bending line match the length of the side faces. Thus, in the final assembled state, a continuous transition is provided between the individual segments.

The pole cores have pole pieces or pole shoes the spacing of which from adjacent pole pieces is greater than the smallest distance between adjacent back iron segments. This ensures that even in the final assembled state, a space is present between the pole pieces opposite each other. The increased distance between the pole pieces is used primarily as a space for the movement of a winding needle and for the winding of the poles.

The second solution of the object is achieved by the method steps a) winding the pole cores with a coil wire and b) bending the webs inwardly by direct application of force to the webs. The winding of the stator core is accomplished by needle winding or similar processes by which a closed stator core may be wound from the inside. By means of the direct application of force to the webs, favorable lever arms come into effect and facilitate the bending of the webs with a small application of force.

BRIEF DESCRIPTION OF THE SEVERAL VIEWS OF THE DRAWINGS

The invention is explained below in detail with reference to exemplary embodiments.

DETAILED DESCRIPTION OF THE INVENTION

Figure 1:
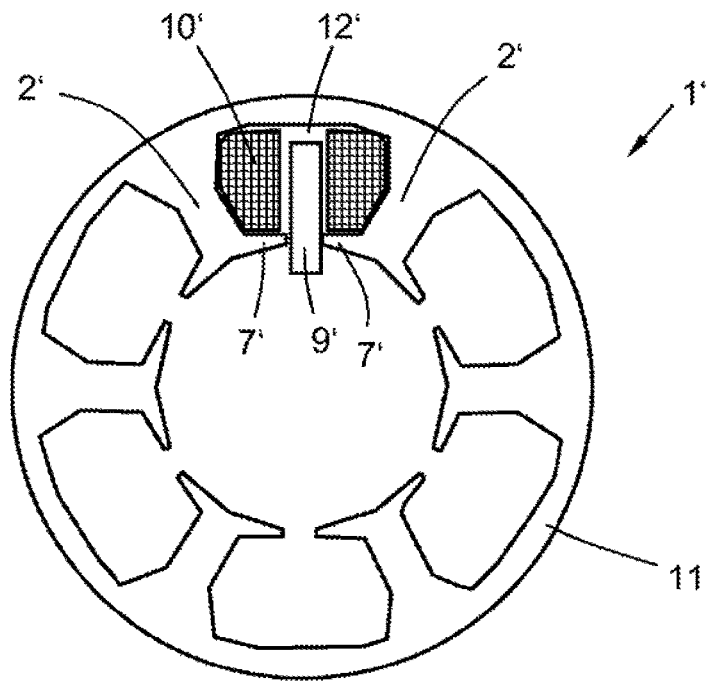
FIG. 1 shows a conventional stator core wound from inside.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a conventional stator corer wound from the inside having a plurality of poles 2' having pole pieces also called pole shoes 7, a winding 10', wherein only a partial winding in a groove 12' is indicated here. The ends of two mutually opposite pole pieces 7' are sufficiently spaced from one another so that there is sufficient space for running a winding needle 9'. Due to geometric factors, the optimum number of turns cannot be achieved with the conventional stator core.

Figure 2:
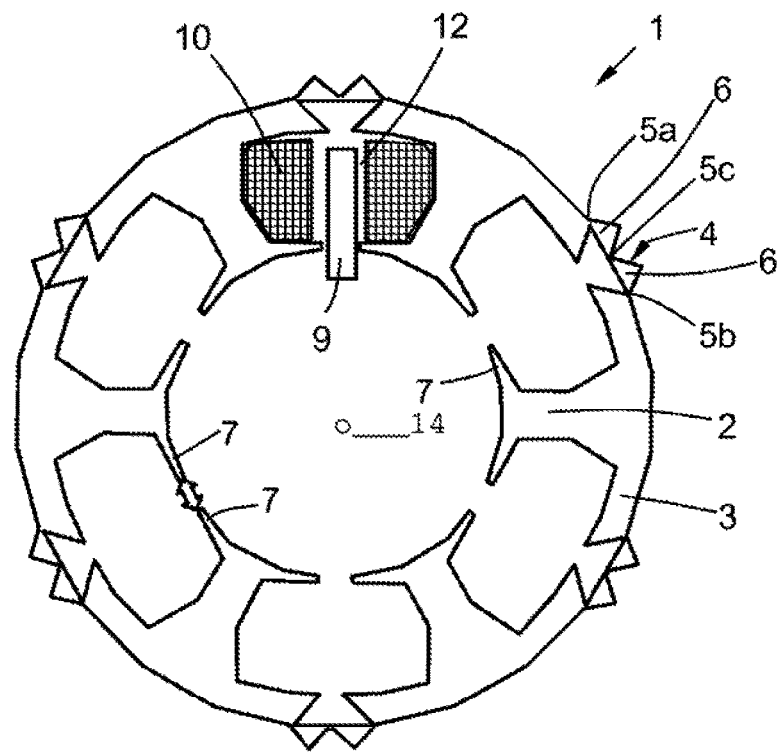
FIG. 2 shows a stator core according to the invention wound from the inside.

In contrast, FIG. 2 shows stator core 1 with a longitudinal axis 14. The stator core 1 is wound from the inside according to the invention through the use of the winding needle. The stator core has a plurality of inwardly facing poles 2 having pole pieces or pole shoes 7 at their inner end and back iron segments 3 at their outer end. As illustrated by a spacing arrow, the distances between the pole pieces 7 are larger than the distances between adjacent pole pieces 7 shown in FIG. 5, but they are about the same size as in the conventional stator core of FIG. 1, since the pole piece spacing must have the same minimum size for introducing the winding needle. Opposing back iron segments 3 are bridged by a corresponding web 4.

A plurality of poles 2, back iron segments 3 and webs 4 form the integrated stator core 1. In this example, the stator core is designed as a laminated stator. The laminated stator is preferably punch-bundled. The webs 4 are connected to adjacent back iron segments 3 via predetermined bending lines 5a and 5b, the lines being perpendicular to the plane defined by a lamination sheet and parallel to each other as well as parallel to the longitudinal axis 14 of the stator core. An intermediate predetermined bending line 5c, also perpendicular to a lamination sheet and parallel to the bending line 5a and 5b, is provided within the webs 4. When all of the lamination sheets are assembled to form the stator core, the webs 4 form two triangular areas 6 with one triangular area being defined between the predetermined bending lines 5a and 5c and the other triangular area being defined between 5b and 5c. The predetermined bending lines 5a, 5b, 5c are constrictions of the web 4. The cross-sectional area of each constriction is dimensioned such that, on the one hand, sufficient strength is provided for the winding operation and for handling and, on the other hand, the required bending forces are not become too large.

Figure 3:
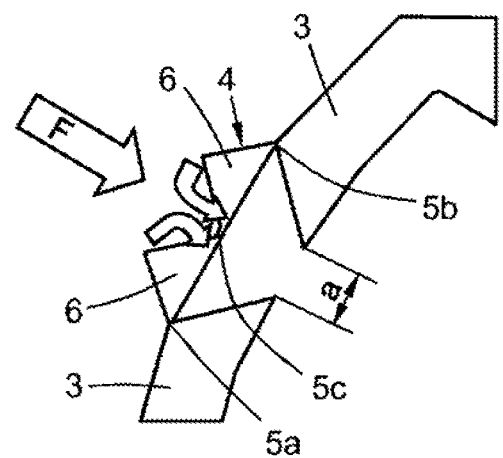
FIG. 3 shows an enlarged view of a web before bending.

FIG. 3 shows an enlarged view of a web 4 of the stator core before bending. The ends of adjacent back iron segments 3 of the stator core have a minimum distance a from each other. A radial force F exerted by a punch on the triangular areas 6 of the web causes a bending of the web 4 at the predetermined bending brie 5c and a bending of the triangular areas 6 at the predetermined bending lines 5a, 5b opposite the back iron segment 3 in the stator core. In the process, the triangular areas 6 pivot around the predetermined bending lines 5a and 5b and the outer tips of the triangular areas 6 move toward each other.

Figure 4:
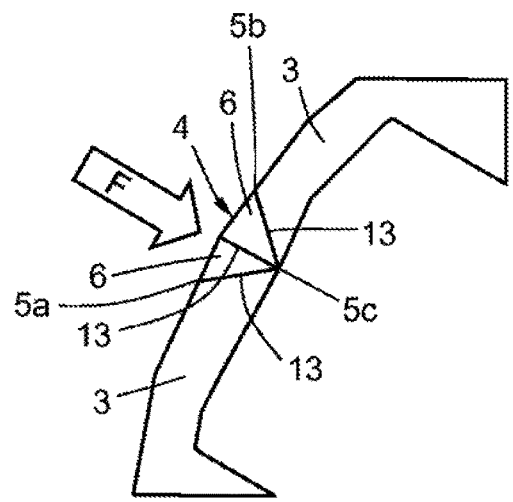
FIG. 4 shows an enlarged view of the web after bending.

FIG. 4 shows an enlarged view of the web after bending. The distance a (FIG. 3) between the ends of the back iron segments 3 has been reduced to zero. The predetermined bending line 5c now touches the ends of the back iron segments. The magnetic back iron is closed via back iron segment 3 to back iron segment 3 by the triangular portions 6 of the webs 4. Since the bending areas are limited to the predetermined bending lines 5a, 5b, 5c, the webs do not deform in the contact surfaces 13 with the back iron segments 3 and with themselves in the contact surfaces 13. The spring-back forces are low.

Figure 5:
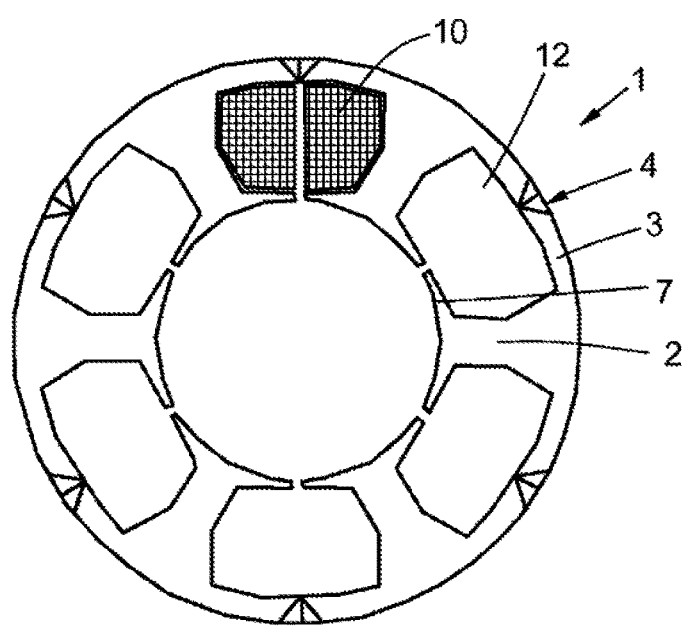
FIG. 5 shows a stator core wound from the inside according to the invention after bending.

FIG. 5 shows the stator core 1 wound from the inside according to the invention after bending each of the lamination sheets, with the poles 2, the back iron segments 3, the webs 4, the pole pieces 7 and the coil 10. The outer diameter of the stator core has decreased compared to the outer diameter of the stator core of FIG. 2 after having been bent; the same applies to the groove width and the distance between the opposing pole pieces 7 and the opposite back iron segments. The winding 10 is indicated only symbolically. In the example shown, all poles 2 are provided with a winding 10.

The stator shown is merely an exemplary embodiment. The present invention also covers all variants that relate to the shape of the web. For the person skilled in the art, it is clear that insulation must be provided between the winding and the stator core or that the winding wires themselves must be insulated. In this connection, a variety of versions, which are not described here, are available. When using insulating covers that are geometrically adapted to the pole and that are pushed onto it, care must be taken that they are designed to move in the area between the poles so that they can compensate for the deformation resulting from the bending of the webs. To this end, the insulating covers can be designed similarly to the stator core, or, for example, Z-shaped compensating connections. The webs can also deform into a loop alter the reshaping process. Basically, there is great freedom of design in this context.

Thus, modifications and variations of the above-described embodiments of the present invention are possible, as appreciated by those skilled in the art in light of the above teachings. It is therefore to be understood that within the scope of the appended claims and then equivalents, the invention may be practiced otherwise than as specifically described.

What is claimed is:

1. A stator core for an electronically commutated DC motor with an internal rotor,
the stator core comprising:
a plurality of back iron segments;
a plurality of webs having triangular areas wherein each of the webs have two outer predetermined bending lines and one intermediate predetermined bending line between the two outer bending lines, wherein the three bending lines are substantially thinner than in areas between the predetermined bending lines and wherein the intermediate predetermined bending line is arranged between two of the triangular areas of each of the webs; and
a plurality of radially inwardly directed pole cores which at their periphery are integral with the back iron segments and the back iron segments are integral with adjacent back iron segments via the webs, wherein the back iron segments alternate with the webs and jointly form a seamless closed one-piece ring, wherein the webs are arranged essentially outside of an outer circle defined by the back iron segments, wherein the distance between the intermediate predetermined bending line and the two outer predetermined bending lines is the same and is slightly larger than the thickness of the back iron segment in the radial direction.

2. A stator core with a longitudinal axis for an electronically commutated DC motor with an internal rotor, the stator core comprising:
a plurality of back iron segments;

a plurality of webs; and a plurality of radially inwardly directed pole cores which at their periphery are integral with the back iron segments and the back iron segments are integral with adjacent back iron segments via the webs, wherein the back iron segments alternate with the webs and jointly form a seamless closed one-piece ring, wherein the webs are initially arranged essentially outside of the outer circle defined by the periphery of the back iron segments and wherein the webs have two outer predetermined bending lines parallel to the longitudinal axis and one intermediate predetermined bending line parallel to the longitudinal axis and between the two outer bending lines, wherein the three bending lines are substantially thinner than in areas between the predetermined bending lines, wherein the intermediate predetermined bending line is arranged between two triangular areas of each of the webs, and wherein the distance between the intermediate predetermined bending line and the two outer predetermined bending lines is the same and is slightly larger than the thickness of the back iron segment in the radial direction.

3. The stator core according to claim 2, wherein the two outer predetermined bending lines are arranged at transitions between the back iron segments and the webs.

4. The stator core according to claim 2, wherein the pole cores each have pole pieces, the spacing of which from the adjacent pole pieces is greater than the smallest distance between adjacent back iron segments.

\* \* \* \* \*